United States Patent
Benoit

(10) Patent No.: US 8,672,357 B2
(45) Date of Patent: Mar. 18, 2014

(54) RELEASABLE RETRACTABLE SEATBELT DEFORMING CLIP

(76) Inventor: Suzanne Benoit, Studio City, CA (US)

( * ) Notice: Subject to any disclaimer, the term of this patent is extended or adjusted under 35 U.S.C. 154(b) by 961 days.

(21) Appl. No.: 12/621,347

(22) Filed: Nov. 18, 2009

(65) Prior Publication Data

US 2010/0127488 A1  May 27, 2010

Related U.S. Application Data

(60) Provisional application No. 61/118,407, filed on Nov. 26, 2008.

(51) Int. Cl.
*B60R 22/00* (2006.01)

(52) U.S. Cl.
USPC .......................... 280/808; 297/483; 297/486

(58) Field of Classification Search
USPC ...................... 280/801.1, 807, 748, 751, 808; 297/482, 487, 488, 486, 483
See application file for complete search history.

(56) References Cited

U.S. PATENT DOCUMENTS

| | | | | |
|---|---|---|---|---|
| 4,319,769 A | * | 3/1982 | Compeau et al. | 280/808 |
| 4,648,625 A | * | 3/1987 | Lynch | 280/808 |
| 4,832,366 A | * | 5/1989 | Corbett et al. | 280/808 |
| 4,946,198 A | * | 8/1990 | Pittore et al. | 280/808 |
| 5,058,922 A | * | 10/1991 | Long | 280/808 |
| 5,080,396 A | * | 1/1992 | Vacanti | 280/808 |
| 5,308,116 A | * | 5/1994 | Zawisa et al. | 280/808 |
| 5,605,380 A | * | 2/1997 | Gerstenberger et al. | 297/483 |
| 6,203,110 B1 | * | 3/2001 | Proteau et al. | 297/483 |
| 6,557,895 B2 | * | 5/2003 | Haack et al. | 280/801.1 |
| 6,592,149 B2 | * | 7/2003 | Sessoms | 280/801.1 |
| 6,880,893 B1 | * | 4/2005 | Scotton | 297/485 |
| 7,059,636 B2 | * | 6/2006 | Berger | 280/808 |
| 7,314,235 B2 | * | 1/2008 | Downey | 280/808 |
| 7,445,245 B2 | * | 11/2008 | Beczkowski et al. | 280/808 |
| 7,513,532 B1 | * | 4/2009 | Vaughns et al. | 280/808 |
| 7,520,532 B2 | * | 4/2009 | Bell et al. | 280/808 |
| 7,971,908 B2 | * | 7/2011 | Hathaway et al. | 280/808 |

* cited by examiner

*Primary Examiner* — Drew Brown
(74) *Attorney, Agent, or Firm* — Edwin Tarver; Lawson & Tarver, LLP

(57) ABSTRACT

An improved seatbelt clip is defined by a retractable tether anchored at the buckle intersection of a seatbelt. The retractable tether is connected at its end to a clipping device that accommodates a folded section of seatbelt. A user folds the shoulder strap of a seatbelt in half longitudinally and inserts the folded strap into the clip which holds it in a position to fit between the breasts of a user. In the event of an accident, the tether causes the clip to dislodge and pulls the clip down and away from the wearer.

10 Claims, 3 Drawing Sheets

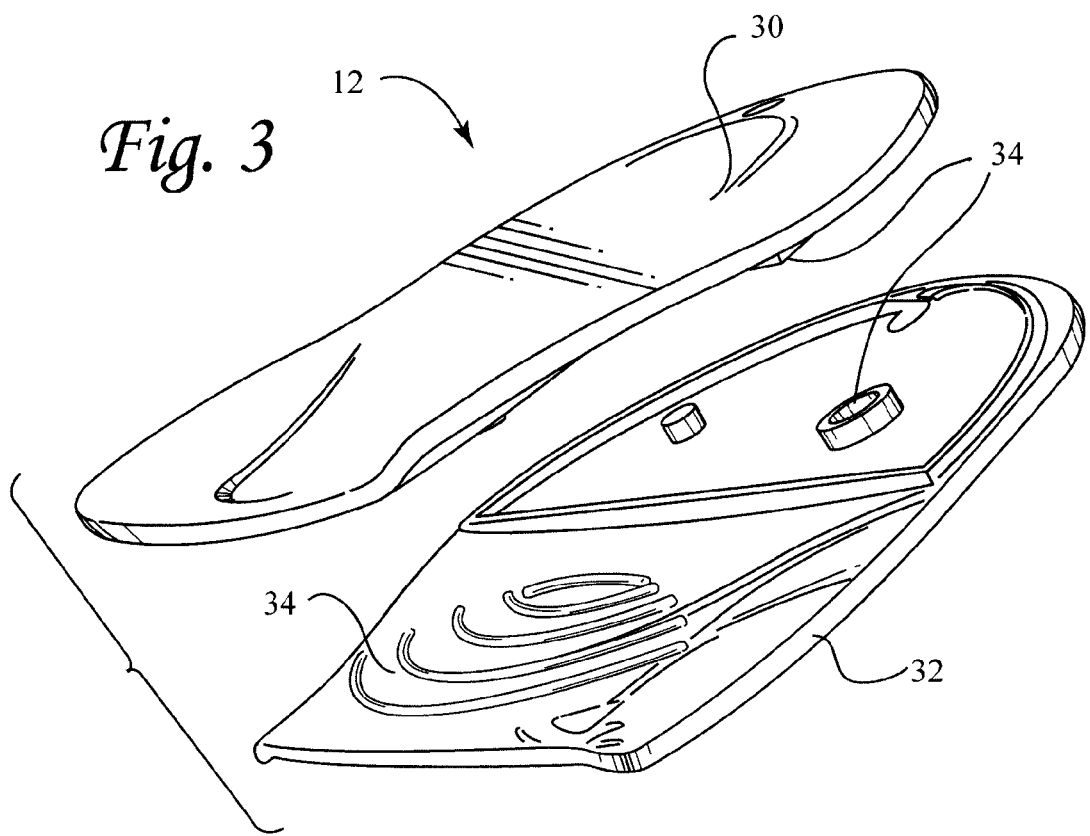
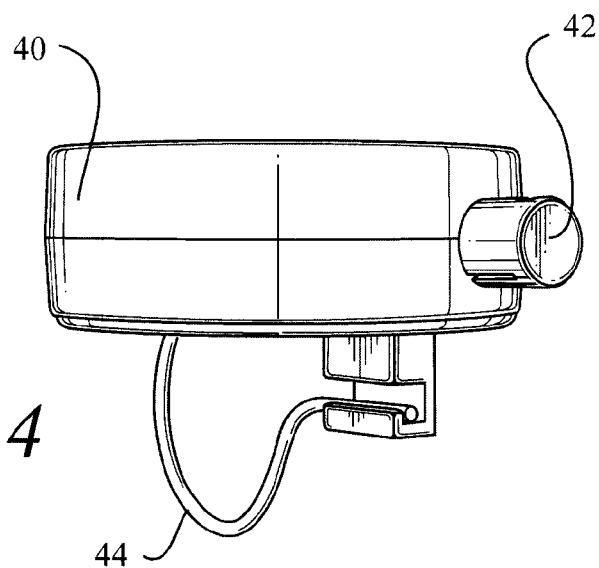

RELEASABLE RETRACTABLE SEATBELT DEFORMING CLIP

This application claims the benefit of the filing date of provisional application No. 61/118,407, filed on Nov. 26, 2008.

BACKGROUND

Seatbelts are known in the art, as are devices for improving the comfort of a seatbelt. Typically, such devices comprise pads that wrap around a seatbelt strap to provide a buffer between the seatbelt strap and the wearer. While these devices may be effective, they do not provide relief in areas where creases of the body are irritated by the edges of a flat seatbelt. Therefore there is a need for a device that provides comfort at the breast area where cleavage causes a flat seatbelt to rest in an uncomfortable position.

It is an object of the present invention to provide a seatbelt clip for holding a seatbelt in a more comfortable position at the intersection of the belt and breast cleavage. Another object of the present invention is to provide a clip for creasing a seatbelt strap, causing it to re-orient at a 90 degree angle to fit between the breasts of a user. A further object of the present invention is to provide a tethered clip for creasing a seatbelt, wherein the tether causes automatically dislodges and retracts the clip in the event of an accident. These and other objects of the invention will become apparent through the appended summary, description and claims.

SUMMARY

The present invention is a device for holding a seatbelt in a creased configuration to turn the belt and improve comfort for the wearer. The seatbelt is creased longitudinally at its midpoint, reorienting it by ninety degrees. The device includes a clip attached to a tether. The tether is attached to a spool including a biased tensioner designed to re-wind the tether. The spool is maintained on an anchor attached at the intersection of a seatbelt buckle.

The clip can be a hinged clip consisting of first and second hinged members. The hinged members interlock and are biased to a predetermined range of motion. The hinge members comprise grips for easy operation. The clip also comprises a locking mechanism with a latch designed to catch the edge of a clip member when the clip is in a closed position. In one preferred embodiment, the faces of the clip members interacting with the seatbelt material are coated with a layer of material for greater adhesion under pressure.

In an alternate embodiment, the clip is unhinged and rather than articulating, the members each have an attached area where they are fastened together. A gripping area adjacent the attaching area is resiliently deformable, allowing a user to slide a creased section of seatbelt into the gripping area to hold it in place under pressure. The clip is designed to hold a seatbelt folded in half, and preferably 1.75 inches wide In an alternate embodiment, a tether collector housing contains the tether, which terminates at an anchoring mechanism. In this embodiment, the tether housing comprises a releasable pin designed to extend through an eyelet or around a structure for anchoring the tether. The tether terminates adjacent to the clip in a disconnecting assembly that makes disassembly of the clip and tether possible, and prevents the tether from retracting into the tether housing.

In another alternate embodiment, the tether is anchored using a belt structure. In this embodiment, a soft strap extends around the buckle portion of a seatbelt. The soft strap comprises a series of neoprene stabilizers. The stabilizers anchor the strap to the buckle and prevent it from sliding and eventually dislodging from its position.

In order to use the safety belt comfort clip, a user first enters a vehicle and fastens a seatbelt including a shoulder strap extending across the user's chest. After connecting the seatbelt buckle, the user grasps the seatbelt clip disposed on the retracted tether and pulls the tether away from the tether housing, extending the tether in substantially the same direction as the seatbelt shoulder strap.

The user then grasps an area of the seatbelt shoulder strap disposed adjacent the user's breasts and folds the area in half. Once the seatbelt is folded in half, the user inserts the folded seatbelt into the tethered clip. In the case of an articulating clip, the jaws of the clip are separated and applied to the seatbelt. In the case of a non-articulating clip, the creased seatbelt is inserted into the jaws of the clip for a pressure fit. Once the seatbelt clip is installed on the creased portion of seatbelt, the belt is reoriented approximately 90 degrees so that it fits more comfortably between the user's breasts.

In the event of an accident, or at any time the seatbelt shoulder strap is substantially deformed from its position across a user's chest, the movement of the seatbelt causes the clip to dislodge from its position and automatically retract back into the tether. Since the tether is anchored at the belt buckle, ordinary shifts in position allow the clip to remain fastened as seatbelt material extends from the seatbelt spool.

BRIEF DESCRIPTION OF THE FIGURES

FIG. 3 is an exploded view of an unhinged pressure-fit clip for holding a creased seatbelt.

FIG. 4 is a side view of a seatbelt tether stored in a tether housing with an attachment pin located on the housing.

DESCRIPTION

Figure 1:
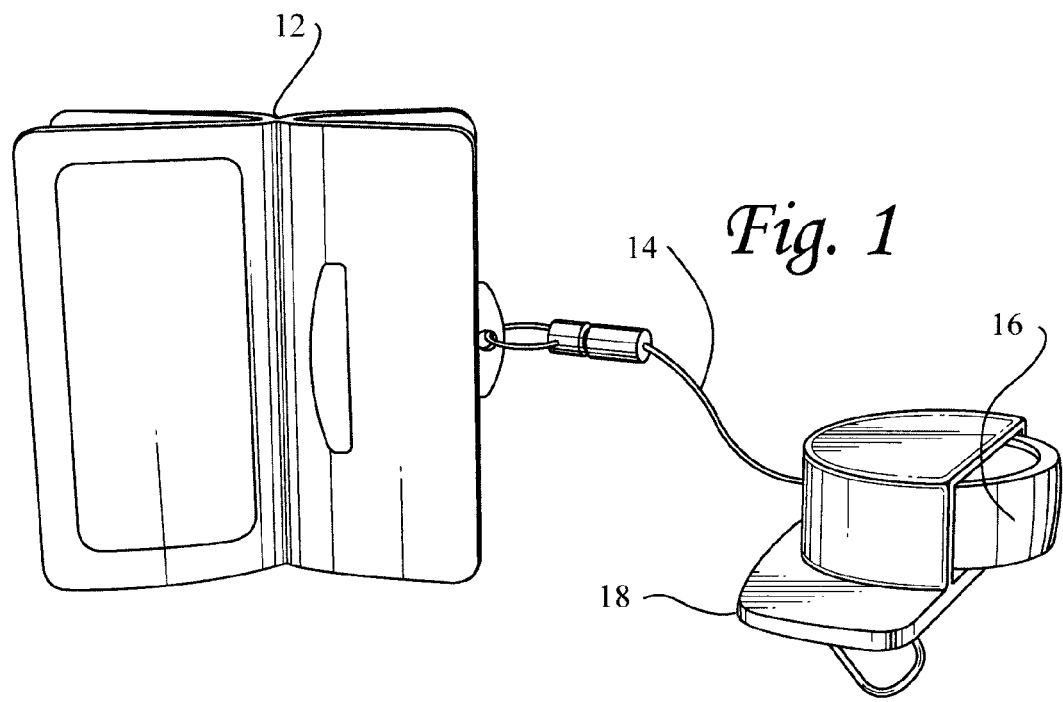
FIG. 1 is a perspective view of a seatbelt comfort clip according to the present invention.

Referring to FIG. 1, the present invention comprises a device adapted to hold a seatbelt in a creased configuration so as to reorient the axis of the belt, improving comfort for the wearer. The seatbelt is creased longitudinally at its midpoint, and in a preferred embodiment, reorients ninety degrees. The device 10 comprises a clip 12 attached to one end of a tether 14. The tether 14 is attached at its other end to a spool 16 which comprises a biased tensioner designed to re-wind the tether onto the spool to be contained within the spool housing. The spool is maintained on an anchor 18 designed to be attached to the intersection of a seatbelt buckle and clip.

Figure 2:
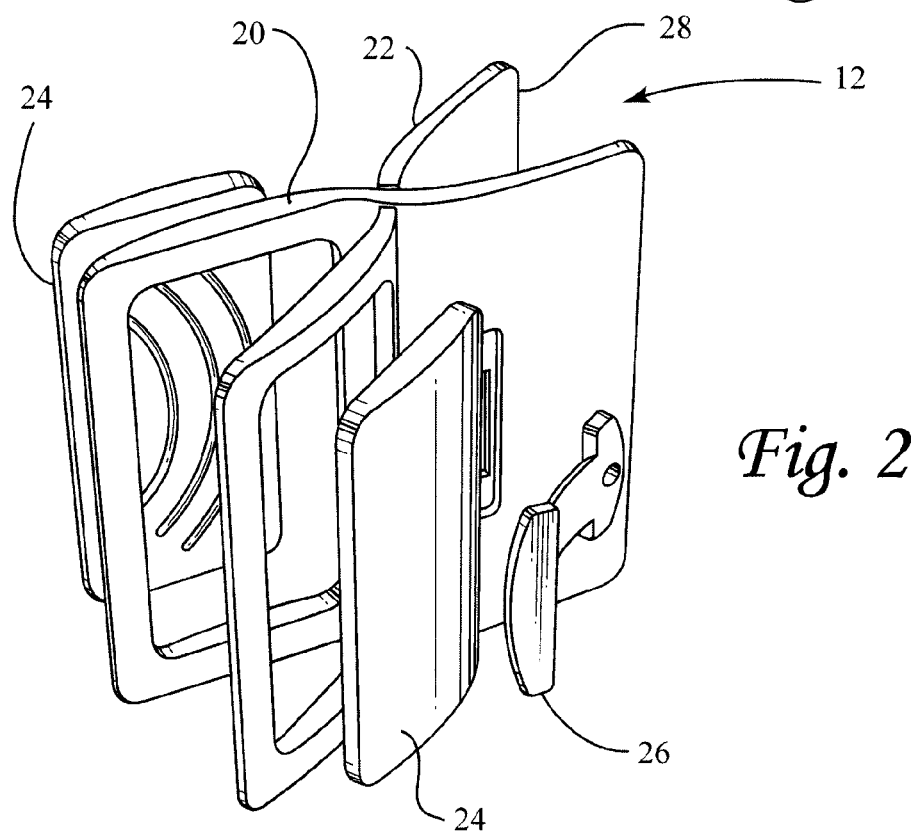
FIG. 2 is an exploded view of a lockable hinged clip for holding a creased seatbelt.

Referring to FIG. 2, an exploded view of the clip 12 is shown. The clip 12 comprises a first hinged member 20 and second hinged member 22. The hinged members 20, 22 are interlocking and biased to a predetermined range of motion. In one preferred embodiment, the hinge members 20, 22 also comprise grips 24 for ease of operation. The clip 12 also comprises a locking mechanism 26. The locking mechanism 26 comprises a latch designed to catch the edge of a clip member once the clip is in a closed position. In one preferred embodiment, the faces of the clip members 20, 22 that interact with seatbelt material are coated with a layer of material 28 for greater adhesion under pressure.

Referring to FIG. 3, an alternate embodiment of the clip is shown, wherein the clip is in an unhinged configuration. In this embodiment, the clip 12 also comprises a first member 30 and a second member 32. However rather than articulating, the members each have an attaching area 34 wherein the clips are fastened together. A gripping area 36 adjacent the attaching area 34 is resiliently deformable, allowing a user to slide a creased section of seatbelt into the gripping area 36, where it will be held in place through pressure. In the various embodiments, the clip is designed to hold a seatbelt folded in half. In a more specific embodiment, the folded seatbelt is substantially 1.75 inches wide Referring to FIG. 4, an alternate embodiment of the retractable tether is shown. In this embodiment, a tether collector housing 40 contains the tether, which terminates at an anchoring mechanism 42 which attaches to the clip (not shown). In this embodiment, the tether housing 40 comprises a releasable pin 44 designed to extend through an eyelet or around a structure for anchoring the tether. The tether terminates adjacent to the clip in a disconnecting assembly that makes disassembly of the clip and tether possible, and prevents the tether from retracting into the tether housing.

Figure 5:
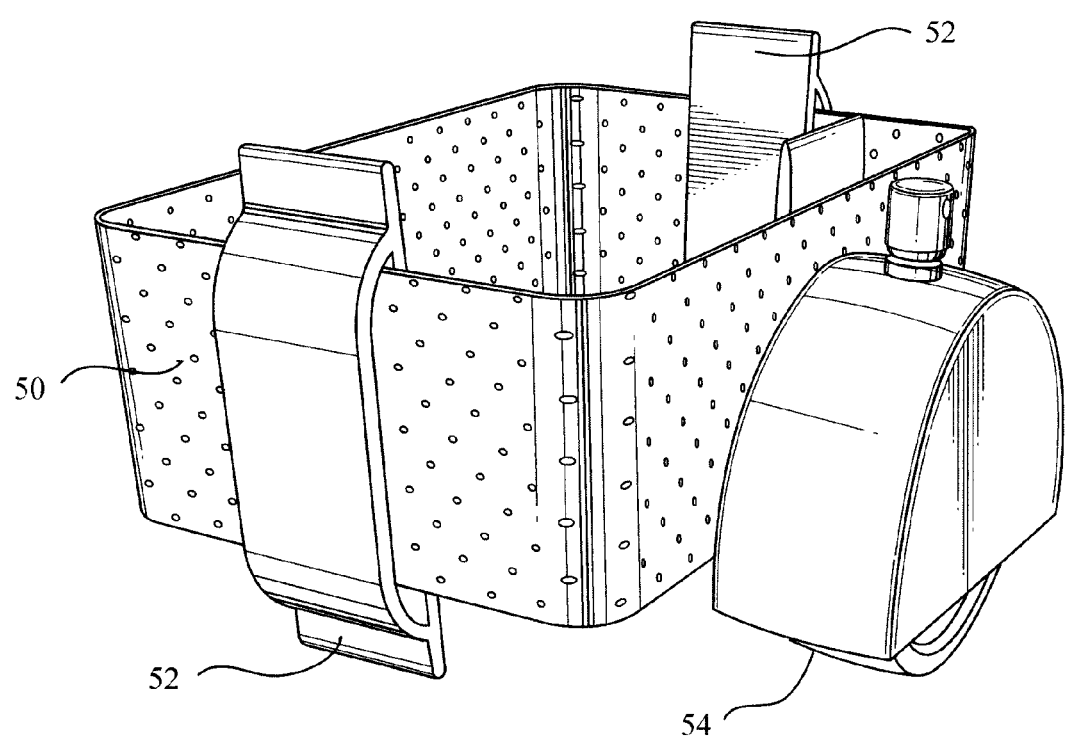
FIG. 5 is a perspective view of a seatbelt clip tether in a tether housing contained in a holder associated with a strap for fastening the clip tether to a seatbelt buckle.

Referring to FIG. 5, an alternate embodiment of the retractable tether is shown wherein the tether is anchored using a belt structure. In this embodiment, a soft strap 50 extends around the buckle portion of a seatbelt. The soft strap 50 comprises a series of neoprene stabilizers 52. The stabilizers 52 help to anchor the strap 50 to the buckle and prevent it from sliding and eventually dislodging from its position. A tether housing 54 comprises an anchoring housing 54 into which the tether housing is inserted. The end of the tether for attachment to the clip extends out of the housing 54.

The structure of the invention having been illustrated, a preferred method of using the invention is now described.

In order to use the safety belt comfort clip, a user first enters a vehicle and fastens a seatbelt including a shoulder strap extending across the user's chest. After connecting the seatbelt buckle, the user grasps the seatbelt clip disposed on the retracted tether and pulls the tether away from the tether housing, extending the tether in substantially the same direction as the seatbelt shoulder strap.

The user then grasps an area of the seatbelt shoulder strap disposed adjacent the user's breasts and folds the area in half. Once the seatbelt is folded in half, the user inserts the folded seatbelt into the tethered clip. In the case of an articulating clip, the jaws of the clip are separated and applied to the seatbelt. In the case of a non-articulating clip, the creased seatbelt is inserted into the jaws of the clip for a pressure fit. Once the seatbelt clip is installed on the creased portion of seatbelt, the belt is reoriented approximately 90 degrees so that it fits more comfortably between the user's breasts.

In the event of an accident, or at any time the seatbelt shoulder strap is substantially deformed from its position across a user's chest, the movement of the seatbelt causes the clip to dislodge from its position and automatically retract back into the tether. Since the tether is anchored at the belt buckle, ordinary shifts in position allow the clip to remain fastened as seatbelt material extends from the seatbelt spool.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A device for increasing the comfort of a seatbelt wearer, comprising:
   a. a clip for deforming a section of a seatbelt adjacent the cleft of the breasts of a user and re-orienting the section to seat in the cleft;
   b. a tether connected to the clip at one end, and connected to a tether collector for gathering the length of the tether at the other;
   c. the tether collector biased toward a position wherein the tether is retracted to the collector; and
   d. an anchor for securely and removably connecting the collector to a position proximal to the seatbelt; and
   e. wherein the clip creases the seatbelt along the longitudinal midpoint of the seatbelt.

2. The device of claim 1 wherein the clip comprises a deformable unitary piece adapted for a pressure fit.

3. The device of claim 1 wherein the clip creases the seatbelt to be approximately 1.75 inches wide.

4. The device of claim 1 wherein the tether collector is anchored at a belt buckle junction.

5. The device of claim 1. wherein the clip is adapted to automatically disengage from the seatbelt upon extension of the seatbelt.

6. The device of claim 1 wherein the tether collector is anchored to a seatbelt tab receptacle by a removable strap.

7. The device of claim 1 wherein the tether collector comprises a clip.

8. The device of claim 1 wherein the clip can be removed from the tether and replaced using a disconnecting assembly.

9. A device for increasing the comfort of a seatbelt wearer, comprising:
   a. a clip adapted to deform a section of a seatbelt adjacent a user's breast cleft to cause the seatbelt section held by the clip to fold in half and re-orient so that the edges of the folded seatbelt are at a ninety degree angle from the adjacent parts of the seatbelt;
   b. an inelastic tether connected to the clip at one end, and housed in a tether collector at the other;
   c. the tether collector biased toward a position wherein the tether is retracted and housed in the tether collector; and
   d. an anchor attached to the tether collector for securely and removably holding the collector in a position proximal to a receptacle side of the seatbelt buckle; and
   e. wherein the clip creases the seatbelt along the longitudinal midpoint of the seatbelt.

10. A method of improving the comfort of a person wearing a seatbelt, comprising the steps of:
    a. putting on a shoulder strap seatbelt and connecting the seatbelt buckle;
    b. grasping a seatbelt clip attached to a retractable seatbelt tether disposed in a housing adjacent the seatbelt buckle and pulling the clip away from the housing;
    c. grasping the area of the seatbelt shoulder strap disposed adjacent the user's breasts and folding, the area in half;

d. installing the clip on the folded portion of the shoulder strap.

* * * * *